United States Patent
Kuehne et al.

(10) Patent No.: US 11,836,864 B2
(45) Date of Patent: Dec. 5, 2023

(54) METHOD FOR OPERATING A DISPLAY DEVICE IN A MOTOR VEHICLE

(71) Applicant: AUDI AG, Ingolstadt (DE)

(72) Inventors: Marcus Kuehne, Beilngries (DE); Daniel Profendiner, Ingolstadt (DE); Nils Wollny, Munich (DE)

(73) Assignee: AUDI AG, Ingolstadt (DE)

( * ) Notice: Subject to any disclaimer, the term of this patent is extended or adjusted under 35 U.S.C. 154(b) by 60 days.

(21) Appl. No.: 17/402,838

(22) Filed: Aug. 16, 2021

(65) Prior Publication Data

US 2021/0375059 A1    Dec. 2, 2021

Related U.S. Application Data

(63) Continuation of application No. 16/754,544, filed as application No. PCT/EP2018/074580 on Sep. 12, 2018, now Pat. No. 11,100,718.

(30) Foreign Application Priority Data

Oct. 9, 2017    (DE) .................... 10 2017 217 923.6

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC .............. G06F 2111/18; G06F 3/0481; G06F 3/04817; G06F 9/4443; G06F 3/04847;
(Continued)

(56) References Cited

U.S. PATENT DOCUMENTS 9,459,692 B1    10/2016    Li
9,589,372 B1     3/2017    Bean et al.
(Continued)

FOREIGN PATENT DOCUMENTS

DE    11 2012 001 022 T5    12/2013
DE    10 2014 009 608 A1    12/2015
(Continued)

OTHER PUBLICATIONS

Japanese Office Action dated Apr. 20, 2021 for Japanese Application No. 2020-540672, 9 pages.
(Continued)

*Primary Examiner* — Todd Buttram
(74) *Attorney, Agent, or Firm* — STAAS & HALSEY LLP

(57) ABSTRACT

Surroundings data, relating to at least one surrounding area in the surroundings of a motor vehicle situated in a field of vision of a vehicle occupant, are obtained by a sensor system of the motor vehicle. At least one piece of information, which needs to be output to the user, is provided by an information source. The information is at least partially overlaid on a display of the surrounding area by a display device with the type of information presentation and/or the position at, and/or the orientation in, which the information presentation is visualized being dependent on the surroundings data.

10 Claims, 2 Drawing Sheets

(51) Int. Cl.
  *G06F 3/01*  (2006.01)
  *G06T 17/05*  (2011.01)
(52) U.S. Cl.
  CPC ........ *G06T 17/05* (2013.01); *G02B 2027/014* (2013.01); *G02B 2027/0138* (2013.01)
(58) Field of Classification Search
  CPC ............... G06F 11/3664; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
  See application file for complete search history.

(56) References Cited

U.S. PATENT DOCUMENTS

| | | | |
|---|---|---|---|
| 11,100,718 B2 * | 8/2021 | Kuehne | G02B 27/017 |
| 2001/0051503 A1 * | 12/2001 | Lush | G06Q 30/06 |
| | | | 455/2.01 |
| 2010/0253596 A1 | 10/2010 | Szczerba et al. | |
| 2012/0201472 A1 * | 8/2012 | Blanchflower | G06V 20/20 |
| | | | 382/224 |
| 2013/0162639 A1 | 6/2013 | Muench et al. | |
| 2015/0062168 A1 * | 3/2015 | Ng-Thow-Hing | |
| | | | G02B 27/0101 |
| | | | 345/633 |
| 2015/0294505 A1 | 10/2015 | Atsmon | |
| 2017/0178498 A1 | 6/2017 | Mcerlean | |
| 2017/0192091 A1 * | 7/2017 | Felix | G06T 19/006 |
| 2017/0253181 A1 | 9/2017 | Choi et al. | |
| 2017/0285343 A1 * | 10/2017 | Belenkii | H04N 13/344 |
| 2017/0287217 A1 | 10/2017 | Kim et al. | |
| 2018/0349568 A1 * | 12/2018 | Schechter | G06F 21/10 |
| 2020/0349770 A1 * | 11/2020 | Kuehne | G02B 27/017 |
| 2021/0375059 A1 * | 12/2021 | Kuehne | G02B 27/017 |

FOREIGN PATENT DOCUMENTS

| | | |
|---|---|---|
| DE | 10 2015 207 337 A1 | 10/2016 |
| DE | 10 2015 012 309 A1 | 3/2017 |
| DE | 10 2016 116 153 A1 | 3/2017 |
| DE | 10 2016 120 425 A1 | 4/2017 |
| EP | 2 415 625 A1 | 2/2012 |
| EP | 2933707 A1 | 10/2015 |
| EP | 3 321 913 A1 | 5/2018 |
| JP | 2004-219664 | 8/2004 |
| JP | 2010-256878 A | 11/2010 |
| JP | 2015-204616 A | 11/2015 |
| JP | 2017-21546 A | 1/2017 |
| KR | 10-2016-0148680 | 12/2016 |
| KR | 10-2017-0064604 | 6/2017 |
| KR | 10-1767507 | 8/2017 |
| WO | 2017/047178 A1 | 3/2017 |

OTHER PUBLICATIONS

WIPO Translation of International Preliminary Report on Patentability for PCT/EP2018/074580, dated Jan. 28, 2020, 5 pp.
International Search Report dated Dec. 7, 2018 in corresponding International Patent Application No. PCT/EP2018/074580.
Office Action dated Jul. 3, 2018 in corresponding German Patent Application No. 10 2017 217 923.6.
U.S. Office Action dated Jan. 26, 2021 from U.S. Appl. No. 16/754,544.
U.S. Office Notice of Allowance dated Apr. 21, 2021 from U.S. Appl. No. 16/754,544.
U.S. Appl. No. 16/754,544, filed Apr. 8, 2020, Marcus Kuehne et al., Audi AG.
Japanese Office Action dated Apr. 4, 2023 for Japanese Application No. 2022-048570.

* cited by examiner

METHOD FOR OPERATING A DISPLAY DEVICE IN A MOTOR VEHICLE

CROSS REFERENCE TO RELATED APPLICATIONS

This application is a continuation of U.S. application Ser. No. 16/754,544, filed on Apr. 8, 2020 which is a U.S. national stage of International Application No. PCT/EP2018/074580, filed on Sep. 12, 2018. The International Application claims the priority benefit of German Application No. 10 2017 217 923.6 filed on Oct. 9, 2017. All prior applications are incorporated by reference herein in their entirety.

BACKGROUND

Described below are a method for operating a display device in a motor vehicle, and the motor vehicle.

A large amount of information is now supposed to be provided for drivers and other occupants in motor vehicles. The information is supposed to be easily graspable but not to distract the driver from the traffic during manual driving.

The document DE 10 2015 012 309 A1 discloses the practice of showing information in a head-up display or in smart glasses. Although the effect achieved by this is that information is available immediately in the field of vision of a user, association of this information with an object or a location to which this information relates is frequently not intuitively possible.

In order to allow information to be grasped more intuitively, it is known practice to overlay complementary information directly on the relevant image areas. Corresponding augmented reality imaging is also known from the document DE 11 2012 001 022 T5, for example. In order to allow this overlaid presentation, the environment is captured via a camera arranged on the smart glasses.

One problem with using augmented reality apparatuses in motor vehicles is that the surrounding situation of an applicable headset or of applicable smart glasses in the motor vehicle is highly complex. Through the windows of the motor vehicle, sometimes quickly moving surroundings are visible, whereas the components of the vehicle itself are substantially stationary or slowly move with the head movements of the user. Moreover, environment areas can be hidden by soiling, reflections, stickers or the like on the windows of the motor vehicle, which means that evaluation of the environment data is hampered further. In particular under adverse weather conditions and/or when it is dark, but also on a clear day, it is therefore barely possible to use standard augmented reality glasses or headsets to allow robust location-oriented display of information in order to enrich the information for the vehicle environment.

SUMMARY

Described below is an improved method of presenting information relating to the surroundings of a motor vehicle. This is achieved by a method that includes:
 capturing surroundings data, which relate to at least one surrounding area in the surroundings of the motor vehicle that is situated in a field of vision of a user, by a sensor system of the motor vehicle,
 providing at least one piece of information, which needs to be output to the user, by an information source,
 visualizing an at least partially overlaid presentation of an information presentation reproducing the information and of the surrounding area for the user by a display device, wherein the type of information presentation and/or the position at, and/or the orientation in, which the information presentation is visualized is dependent on the surroundings data.

Accordingly, it is therefore proposed that the type of information presentation or the position and/or orientation of the information presentation be determined on the basis of surroundings data captured by a sensor system of the motor vehicle. If for example smart glasses or a headset is/are now used for augmented reality presentation, the information presentation with the surroundings is now no longer or no longer exclusively recorded on the basis of the image data captured via the display device's sensor system, but rather sensor data of the motor vehicle are used instead or additionally.

This results in several advantages. First, modern motor vehicles frequently contain a complex sensor system that goes far beyond a sensor system as provided on augmented reality glasses, for example. By way of example, motor vehicles may include one or more cameras that capture the environment of the motor vehicle in the range of visible light and/or in the infrared range. A motor-vehicle-based sensor system can also directly capture distances or relative speeds in relation to objects, however. This is possible for example by 3D cameras, for example time-of-flight cameras, by radar sensors or by laser scanners. There are therefore potentially multiple sources available for surroundings data that allow a better environment model to be determined than would be possible by a single camera of augmented reality glasses, for example.

The existing sensor system is moreover already optimized for capturing a motor vehicle environment, since it is used for this task anyway. Moreover, the motor-vehicle-based processing of surroundings data is frequently also optimized to allow robust object detection despite relatively high relative speeds. For the reasons mentioned, a motor-vehicle-based sensor system therefore provides a substantially better representation of the vehicle surroundings than would be possible by a sensor system of augmented reality glasses, for example.

At the same time, the method according to the invention is implementable with relatively low technical complexity, however. A high-quality motor-vehicle-based sensor system is frequently present in motor vehicles anyway in order to assist a driver in driving or to allow semiautomated or automated operation of the motor vehicle. Moreover, user-wearable display devices, that is to say for example smart glasses, frequently already have interfaces for wireless communication that are also able to communicate with motor-vehicle-based communication devices immediately or with minor adjustments. By way of example, communication can take place via Bluetooth® or WLAN. The communication protocol used can be an Internet protocol that can operate on the Internet or network layer. By way of example, a motor-vehicle-based communication device can communicate with a separately formed display device via the "Adaptive Internet Protocol" (AIP). In this instance, an application for visualization of information can run on a motor-vehicle-based or motor-vehicle-external server that supplies the display device, as display, with information to be presented. The data rate can in this case be dynamically matched to the connection quality. The AIP also supports inputs from the display, for example in order to communicate a relative movement or position of a display device, worn on the head of the user, in relation to the motor vehicle to the server.

The information presentation can take place in the form of letters, symbols and/or numbers. It can be a two-dimensional graphic or include a two-dimensional graphic. It is possible here for the two-dimensional graphic to be presented as a text panel directly in an appropriate position. The graphic or the alphanumeric presentation can be transparent here, but it is possible for an appropriate background to be presented in order to improve legibility or visibility.

It is also possible for the information to be presented three-dimensionally initially and for a two-dimensional information presentation to be first calculated by two-dimensional mapping by a virtual camera. This can involve the information being presented as a three-dimensional shape, for example as an arrow for giving navigation instructions. However, it is also possible for information to be presented two-dimensionally, with the surface on which the information is presented first being positioned and oriented and/or curved in a virtual three-dimensional space and subsequently being shown.

A type of the information presentation is intended to be understood to mean the way in which the information is shown. By way of example, at least one color of a presentation and/or of a background and/or the shape of a three-dimensional object that presents the information and/or a shape of a surface on which the information is presented can be dependent on the surroundings data.

The method according to the invention can involve potentially different information being presented. By way of example, navigation information can be presented. This can be done in the form of arrows presented in a manner overlaid on the surroundings. Alternatively or additionally, virtual information panels can be presented at specific positions or for specific objects, which information panels, as explained, can immediately be presented two-dimensionally or can be placed in a coordinate system as three-dimensional surfaces first and then projected. By way of example, the information presented can be road names, house numbers or distances or relative speeds of other road users. However, it is also possible, in particular within the framework of at least semiautomated driving or for vehicle occupants who are not the driver, to provide background information that does not directly relate to driving. By way of example, information about restaurants and shops and/or attractions can be visualized.

The method according to the invention can involve a display device being used that is in a separate form from the motor vehicle and is designed to be secured to the head and in the field of vision of the user. It can in particular be augmented reality or virtual reality glasses or an applicable headset. Alternatively, the display device used can also be a display device of the motor vehicle itself, for example a display. It is also possible for the display device used to be a display device in a separate form from the motor vehicle that is mounted on a mount on the motor vehicle, for example, or is held by a user in his hand. By way of example, a smartphone can be used as display device.

If a display device that is in a separate form from the motor vehicle is used, then, in particular if information is supposed to be shown in the field of vision of the user, it is advantageous if a relative position of this display device in relation to the motor vehicle and hence in relation to the sensor system of the motor vehicle that is used for capturing the surroundings data is known. It is thus possible for the display device to have a position sensing device that detects a relative position and/or orientation of the display device in relation to a reference position and/or reference direction that is fixed relative to the motor vehicle, or a piece of reference information from which the relative position and/or orientation are ascertained. By way of example, the display device can have a camera or other sensor system for environment capture. If the display device used is a smartphone or augmented reality or virtual reality glasses or an applicable headset, such a sensor system is frequently present anyway. Evaluation of the sensor data of this further sensor system, for example the image data of the camera, allows the relative position and/or orientation of the display device in relation to the reference positions and/or reference direction that is/are fixed relative to the motor vehicle to be ascertained. By way of example, specific markings and/or prominent, static elements of the motor vehicle interior or of the motor vehicle body can be captured by the further sensor system and recognized by evaluation of the sensor data. The ascertainment of a position or orientation of a sensor system relative to prominent markings captured by the sensor system is known in principle in the related art and will not be explained in detail. The evaluation of the further sensor data to determine the relative position or orientation can be performed by a processing device of the display device, a motor-vehicle-based processing device and/or a vehicle-external processing device.

The display device used can be a video-based display device, wherein the visualization of the surrounding area involves an image of the surrounding area being captured and presented by the sensor system or a further sensor system. Alternatively, a semitransparent display device can be used by which at least part of the surrounding area is visible to the user through the output device. It is also possible for the display device used to be a virtual retinal display by which the information presentation is projected onto the retina. Such display devices are known in principle from other areas of application and will thus not be explained in detail.

Evaluation of the surroundings data can result in at least one object or at least one position being detected, wherein the information to be output is provided on the basis of a property of the detected object or on the basis of the position. The information to be presented can therefore in particular be associated with fixed positions in the surroundings or positions at which a specific object is located. The information presentation may be visualized such that it can be associated with the position or the object clearly by the user.

For objects, it is possible for example for an object class or object identification to be determined, and supplementary information can be read from a database as information source. Alternatively, the information source used for objects can also be the or a further vehicle-based sensor system, a vehicle-to-vehicle or vehicle-to-infrastructure communication or the like. By way of example, it can be advantageous if information pertaining to other road users or pertaining to infrastructure devices, for example pertaining to traffic lights, is supposed to be shown.

It is possible for a driving mode of the motor vehicle, whether the user is the driver and/or a configuration prescribed by the user to be taken as a basis for selecting which information is presented and for which objects or positions information is presented. By way of example, exclusively information relevant to driving can be presented for a driver during manual driving. For other occupants or during fully automated driving, relevant information pertaining to specific places or buildings, contact data for friends whose vehicles have been detected in the environment or the like can be presented, for example.

Evaluation of the surroundings data can result in the or an object being detected, wherein a position and/or an orientation of the object is/are taken as a basis for determining the type of information presentation and/or the position at, and/or the orientation in, which the information presentation is visualized. By way of example, the information presentation can be effected such that it seems to the user that the information presentation floats above the object or that it appears as though it were projected onto the object or stuck onto the object as a type of sticker. This renders the information and the association with the object particularly intuitively graspable.

A three-dimensional surroundings model describing the surrounding area can be ascertained from the surroundings data, wherein the information and the surroundings model are taken as a basis for generating a three-dimensional or two-dimensional information object and positioning and/or orienting the latter in a coordinate system prescribed for the surroundings model, after which the information presentation is generated by projection of the information object. Projection can involve the use of a virtual camera that is arranged in the surroundings model such that its capture range corresponds to the angle of vision of the user or such that it views the surroundings model from the perspective of the user. The surroundings model itself may not be shown. Instead, what may be shown reproduces only the information object viewed from the applicable perspective. The described projection also allows the position of the information presentation to be prescribed.

In the case of a semitransparent display device through which the surrounding area is visible, or a projection of the information presentation into the eye of the user, it is sufficient to show the information presentation determined as discussed above in the field of vision of the user, or to project the data. If a video-based display device is used, on the other hand, then a representation of the surrounding area should moreover be presented. Such a representation can be captured by a sensor system, for example a camera of the display device, or by the or a further sensor system of the motor vehicle.

As already explained, it is possible to present the information itself two-dimensionally, but to adapt this two-dimensional presentation to a three-dimensional surface of the surroundings. In the surroundings model, a surface of the or of an object can be selected, the two-dimensional information object being arranged on this surface. This can be done for example by virtue of the two-dimensional information object being provided as a pixel or vector graphic and being put onto the applicable surface as a texture. The surface can be planar or curved. The surface can in particular be a surface of the object for which applicable information is supposed to be provided. The approach described allows information to be projected or stuck virtually onto objects, for example house walls or motor vehicles.

The surroundings data or the surroundings model can be provided to a motor-vehicle-external device that prescribes the type of information presentation and/or the position at, and/or the orientation in, which the information presentation is visualized. The communication with the motor-vehicle-external device may be effected wirelessly. The device can additionally provide the outputting information, that is to say can serve as an information source. By way of example, the motor-vehicle-external device can identify in the surroundings data positions and/or objects for which information is supposed to be provided, can select applicable information, for this one type of information presentation, can prescribe a position and/or an orientation and can provide the applicable information presentations, with position or orientation information, or an overall image presenting the surroundings of the motor vehicle with the information presentations overlaid thereon to the motor vehicle. Numerous other alternatives are also possible, however. By way of example, the information source used can be a different motor-vehicle-external device or a motor-vehicle-internal device, for example a map database in the motor vehicle, a motor-vehicle-internal sensor system or the like. In this case, it is possible for the information to be additionally transmitted with the surroundings data to the motor-vehicle-external device in order to be processed further therein. Alternatively, the motor-vehicle-external device can provide parameters to the motor vehicle that prescribe the form and/or position and/or orientation of the information presentation.

The use of a motor-vehicle-external device can be advantageous in order to reduce the processing complexity required in the motor vehicle and in the display device. Since short response times can now also be achieved with wireless communication, the technical complexity for implementing the method can therefore be reduced further.

Besides the method summarized above, also described herein is a motor vehicle with a sensor system for capturing a surrounding area and configured to perform the method. The motor vehicle may have a communication device for communicating with a display device that is in a separate form from the motor vehicle and/or with a motor-vehicle-external device that provides the information and/or prescribes the type, the position and/or the orientation of the information presentation. The motor vehicle may include a processing device that can ascertain the type, position and/or orientation of the information presentation on the basis of the surroundings data and/or can ascertain the information presentation from the information.

BRIEF DESCRIPTION OF THE DRAWINGS

These and other aspects, advantages and details will become more apparent and more readily appreciated from the exemplary embodiments described below and the associated drawings, in which, schematically.

DETAILED DESCRIPTION

Figure 1:
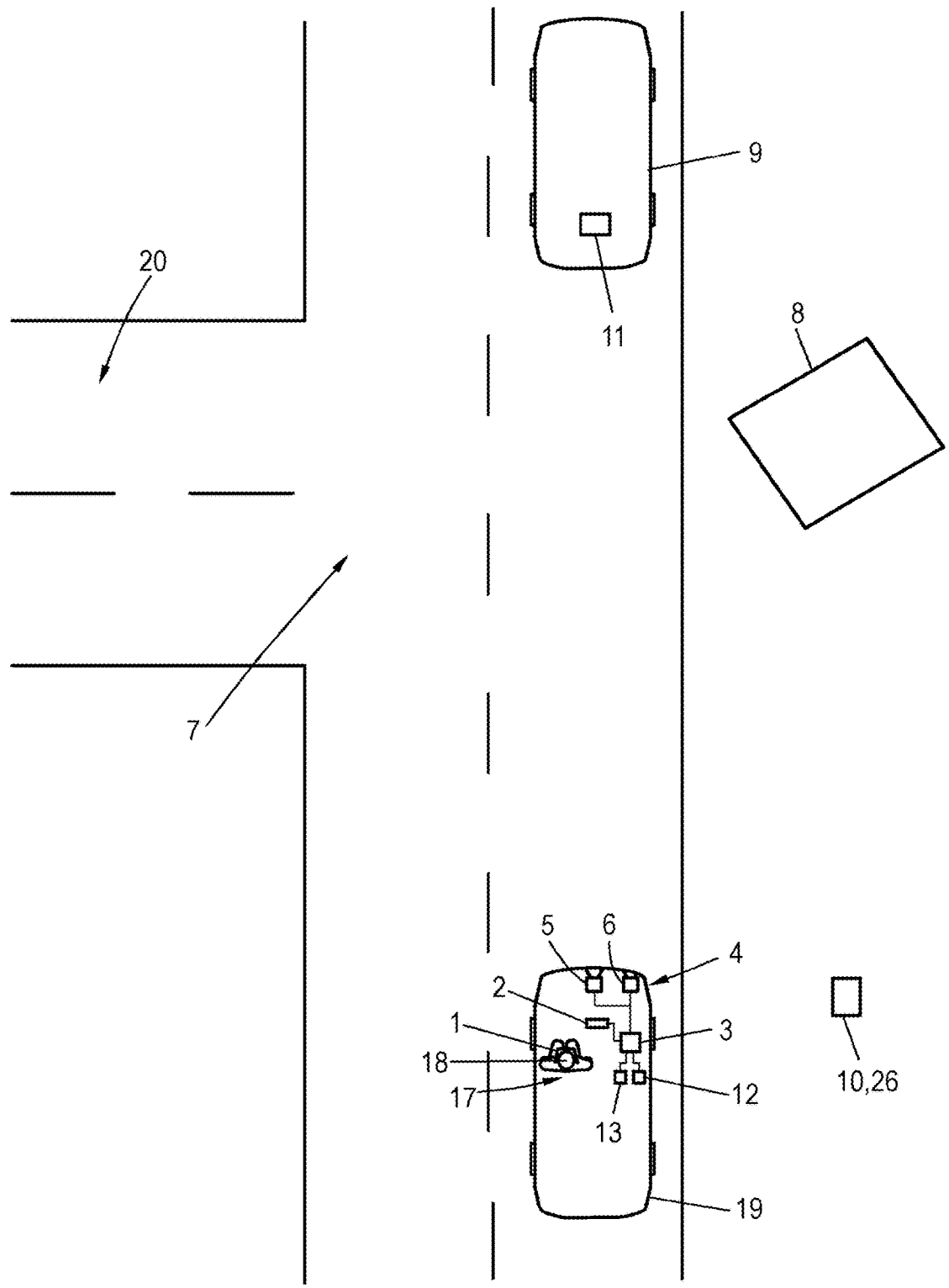
FIG. 1 is a plan view of a traffic situation in which an exemplary embodiment of the method is performed by an exemplary embodiment of the motor vehicle.

Reference will now be made in detail to the preferred embodiments, examples of which are illustrated in the accompanying drawings, wherein like reference numerals refer to like elements throughout.

FIG. 1 shows a traffic situation in which a method for operating a display device 1, 2 is used in a motor vehicle 19. The display device 1 is a display device in a separate form from the motor vehicle 19 that is secured to the head 18 of the user 17 in his field of vision. The display device 1 is augmented reality glasses, which will be explained in more detail later on with reference to FIG. 3. Such a display device allows a particularly intuitive information presentation. Alternatively or additionally, however, the method described below can also be used to display information on the display device 2, a display arranged permanently in the motor vehicle 19.

While the motor vehicle 19 is being driven, surroundings data are captured that relate to the surrounding area that is in the field of vision of the user 17. The surroundings data are captured by a sensor system 4 of the motor vehicle. By way of example, a camera 5 and a radar sensor 6 in the front area of the motor vehicle 19 are shown. It would also be possible for exclusively the camera 5, exclusively the radar sensor 6, multiple cameras 5, multiple radar sensors 6 and/or further sensors, for example a laser scanner, to be used to capture the surroundings data.

The surroundings data are processed by a processing device 3 of the motor vehicle in order to detect relevant positions 7 and objects 8, 9 in the environment of the motor vehicle 19 that are supposed to have information provided about them for the user 17. The position 7 is the position of a junction at which the motor vehicle 19 is supposed to turn according to a scheduled route. Information in this regard is provided by the information source 13, a navigation system of the motor vehicle 19. The object 8 is a building. By way of example, an address for the object 8 can be provided as information. Alternatively or additionally, offer or advertising information can be provided if it is a shop, or for example historical information if it is an attraction. Applicable information can be provided by an information source 10 that is in a separate form from the motor vehicle 19, for example a backend server.

The object 9 is a further motor vehicle. Information regarding this motor vehicle, that is to say for example a speed of travel or contact data if the motor vehicle is the vehicle of a friend, can be provided by the information source 11 via a vehicle-to-vehicle communication. For communicating with the vehicle-external information sources 10, 11, the motor vehicle is provided with a communication device 12.

Figure 2:
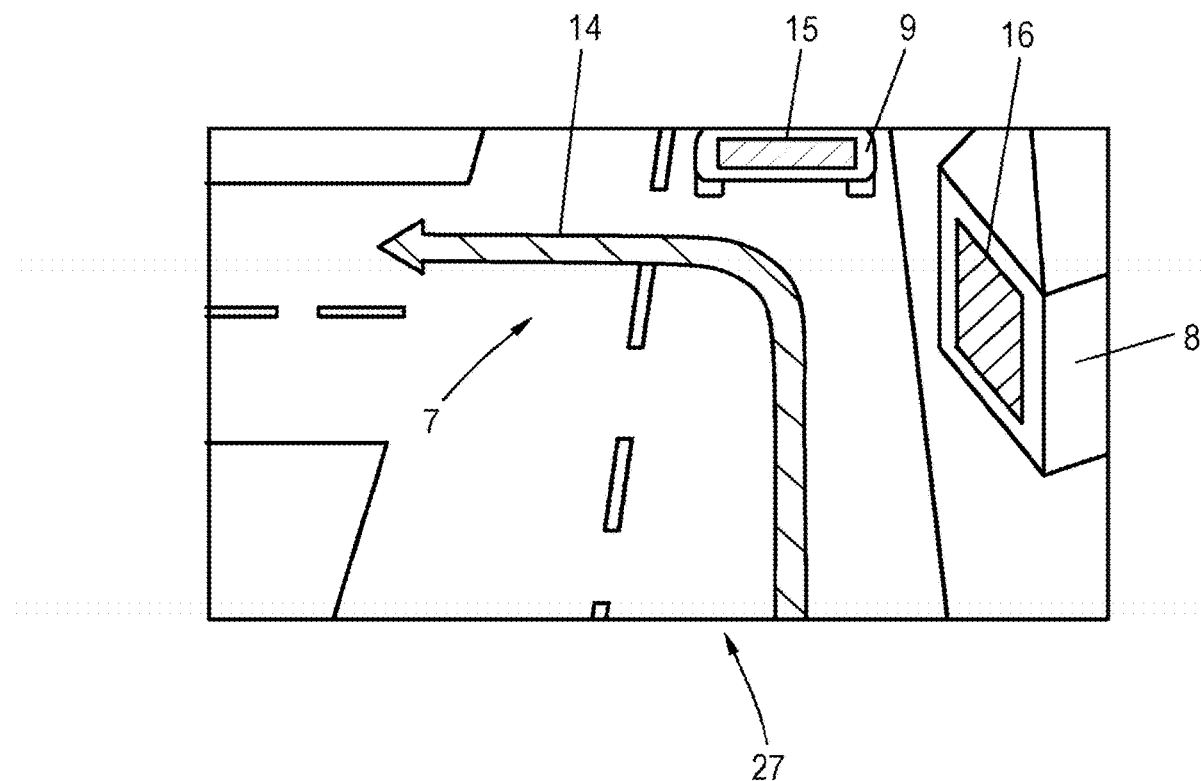
FIG. 2 is a perspective view with an overlaid presentation of an information presentation and of the surrounding area in the traffic situation shown in FIG. 1.

The various information is supposed to be presented for the user 17 such that the associated information presentations can be associated intuitively with the position 7 and the objects 8, 9 by the user 17. An example of such a presentation 27 is shown in FIG. 2. The information presentation 14 presented, which is a turn at the position 7, is supposed to be a three-dimensional arrow that is supposed to float above the road somewhat in the field of vision of the user 17. The information presentations 15, 16, on the other hand, are supposed to appear as though they were stuck or projected onto the objects 8, 9.

To allow this type of presentation, the processing device 3 first processes the surroundings data in order to calculate a three-dimensional surroundings model of the surrounding area. Within this surroundings model, the position 7 and the positions and orientations of the ego motor vehicle 19 and of the objects 8, 9 are known. Accordingly, the information presentation 14 can be shaped, positioned and oriented as a three-dimensional arrow so that it extends in this surroundings model from the ego motor vehicle 19 to the lane 20 into which the vehicle is supposed to turn off at the position 7.

The information presentations 15, 16 are first generated as two-dimensional textures. Finally, surfaces associated with the respective objects 8, 9 are extracted from the surroundings model, and the respective information presentation 15, 16 is placed onto these surfaces as a texture.

As will be explained in even more detail below, a line of vision of the user 17 and hence a position and orientation of the display device 1 are ascertained. This position and orientation is used as the position and orientation of a virtual camera in the three-dimensional surroundings model in order to generate the information presentations 14, 15, 16 by projection of the applicable surfaces or of the three-dimensional object.

In an alternative exemplary embodiment, the surroundings data could also be processed by a vehicle-external device 26 in order to determine the type of the information presentations 14, 15, 16 and the position and/or orientation of their presentation. This allows the processing complexity in the motor vehicle to be lowered.

Figure 3:
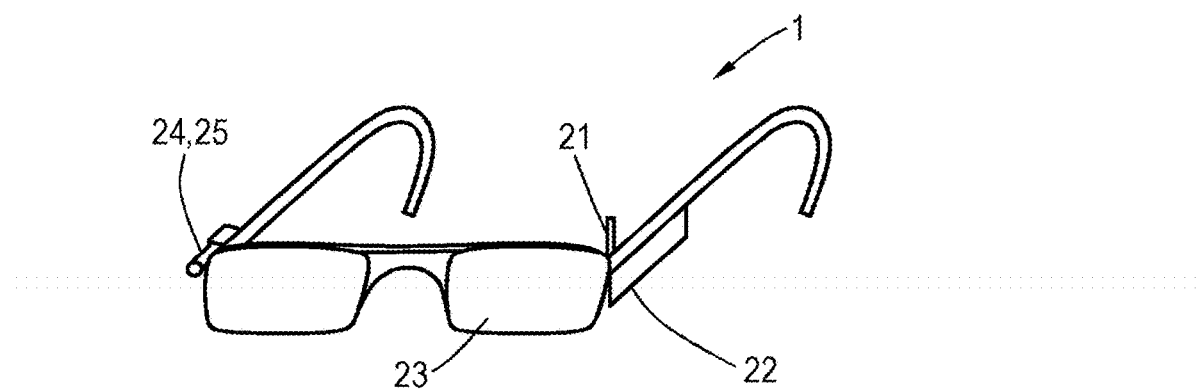
FIG. 3 is a perspective view of the display device used in FIG. 1.

FIG. 3 shows a detailed view of the display device 1. The image to be displayed can be ascertained by the processing device 3 of the motor vehicle 19 and transmitted to control electronics 22 of the display device via the motor-vehicle-based communication device 12 and the display device's communication device 21. This can involve an image being transmitted that includes the information presentations 14, 15, 16 and indicates for the further image areas that the display device 1 is supposed to be transparent in these areas. Accordingly, a semitransparent display element 23 is actuated such that it displays the information presentations 14, 15, 16 in appropriate areas and otherwise remains transparent, which means that an overlay of the information presentations 14, 15, 16 on the surrounding area viewed directly through the transparent display device is visualized for the user 17.

Alternatively, it would be possible for the information presentations 14, 15, 16 to be projected directly onto the retina of the user 17 by the display device 1. It would also be possible to use a video-based display device. Image areas in which no information presentations 14, 15, 16 are displayed can be taken from a background image captured by the further sensor system 24 of the display device 1. Alternatively, it would also be possible for the background image to be captured by the vehicle-based sensor system 4 and likewise transmitted to the display device 1.

In order to enable the approach explained above, the relative position and orientation of the display device 1 in relation to the motor vehicle 19 and hence the sensor system 4 needs to be known. In order to ascertain this position and/or orientation, the further sensor system 24 can capture prominent elements and/or markings in the vehicle interior. Applicable image data can be used as reference information from which the relative position and/or orientation of the display device 1 in relation to the motor vehicle 19 is ascertainable. The further sensor system 24 therefore serves as a position sensing device 25 for the display device 1. The position and orientation can be determined by the processing device 3, for example.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A method for operating a display device in a motor vehicle, comprising:
    capturing surroundings data relating to at least one surrounding area in surroundings of the motor vehicle, situated in a field of vision of a user, by a sensor system of the motor vehicle;
    obtaining at least one piece of information, to be output to the user, from an occupant of the motor vehicle; and
    visualizing an at least partially overlaid presentation of an information presentation reproducing the at least one piece of information and the at least one surrounding area for the user by the display device with at least one of a type of the information presentation, positioning of the information presentation and presentation orientation of the information presentation being dependent on the surroundings data.

2. The method according to claim 1, wherein the at least one piece of information relates to an attraction in the surroundings of the motor vehicle.

3. The method according to claim 1, wherein the display device is a video-based display device,
   wherein the visualizing of the at least partially overlaid presentation includes one of
      capturing an image of the at least one surrounding area by one of the sensor system and a further sensor system, and displaying the image on the video-based display device with the information presentation overlaid thereon,
      overlaying the information presentation via a semitransparent display device with at least part of the at least one surrounding area visible to the user through the semitransparent display device, and
      projecting, via a virtual retinal display, the information presentation onto at least one retina of the user.

4. The method according to claim 1,
   further comprising evaluating the surroundings data to specify at least one object or at least one position, and
   wherein the visualizing of the at least partially overlaid presentation is based on a property of the at least one object or the position.

5. The method according to claim 1,
   further comprising evaluating the surroundings data to specify at least one object, and
   wherein the method further comprises determining, based on at least one of a position and an orientation of the at least one object, the at least one of the type of information presentation, the positioning of the information presentation and the presentation orientation of the partially overlaid presentation.

6. A motor vehicle, comprising:
   a sensor system configured to capture at least one surrounding area in surroundings of the motor vehicle, situated in a field of vision of a user;
   a processor configured to obtain at least one piece of information, to be output to the user, from an occupant of the motor vehicle; and
   a display, coupled to the sensor system and the processor, configured to visualize an at least partially overlaid presentation of an information presentation reproducing the at least one piece of information and the at least one surrounding area for the user, with at least one of a type of the information presentation, positioning of the information presentation and presentation orientation of the information presentation being dependent on the surroundings data.

7. The motor vehicle according to claim 6, wherein the at least one piece of information relates to an attraction in the surroundings of the motor vehicle.

8. The motor vehicle according to claim 6, wherein the display visualizes the at least partially overlaid presentation by one of
   capturing an image of the at least one surrounding area by one of the sensor system and a further sensor system, and displaying the image on the video-based display device with the information presentation overlaid thereon,
   overlaying the information presentation via a semitransparent display device with at least part of the at least one surrounding area visible to the user through the semitransparent display device, and
   projecting, via a virtual retinal display, the information presentation onto at least one retina of the user.

9. The motor vehicle according to claim 6, wherein the processor is further configured to
   evaluate the surroundings data to specify at least one object or at least one position, and
   visualize the at least partially overlaid presentation based on a property of the at least one object or the position.

10. The motor vehicle according to claim 6, wherein the processor is further configured to
    evaluate the surroundings data to specify at least one object, and
    determine, based on at least one of a position and an orientation of the at least one object, the at least one of the type of information presentation, the positioning of the information presentation and the presentation orientation of the partially overlaid presentation.

* * * * *